July 12, 1960 — J. M. CAGE — 2,945,089
MICROWAVE TELEVISION SYSTEM
Filed Aug. 30, 1943 — 2 Sheets-Sheet 1
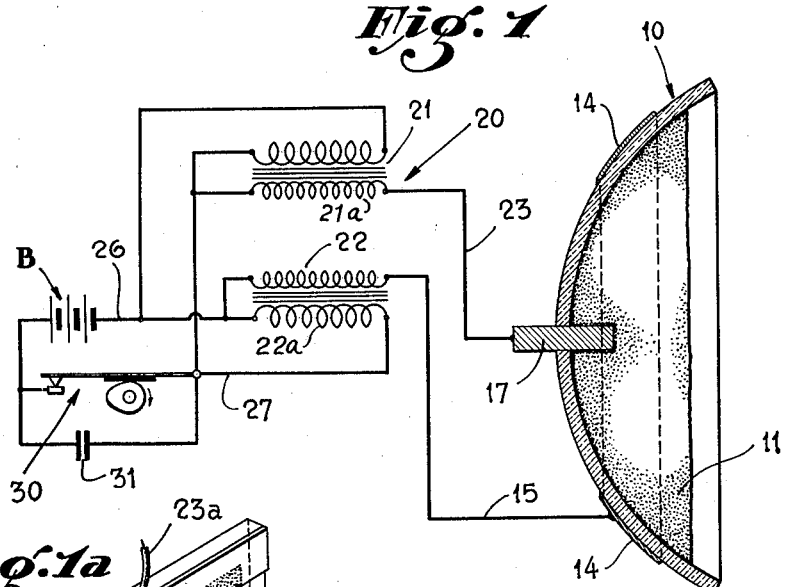
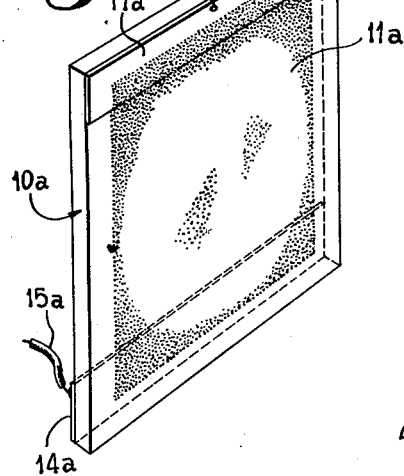
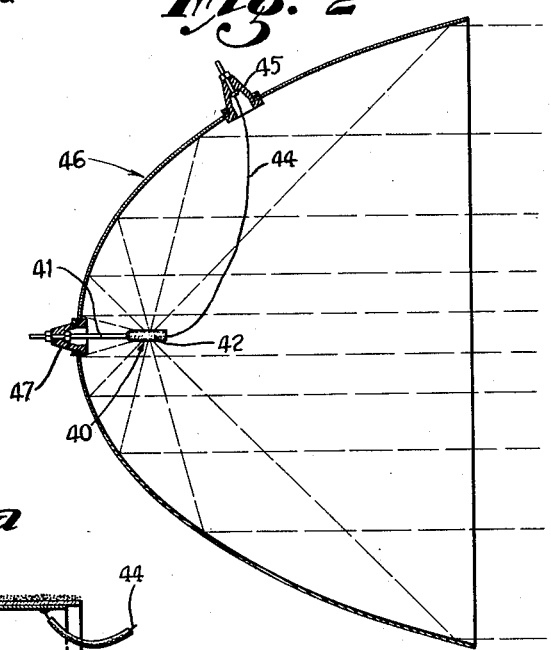
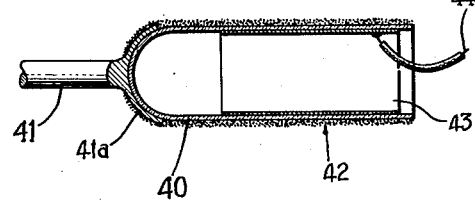
Inventor:
JOHN M. CAGE,
By Forrest J. Lilly
Attorney.

July 12, 1960

J. M. CAGE 2,945,089

MICROWAVE TELEVISION SYSTEM

Filed Aug. 30, 1943

Inventor:
JOHN M. CAGE,
By
Attorney.

2,945,089
MICROWAVE TELEVISION SYSTEM

John M. Cage, Upper Montclair, N.J., assignor to Sturdy-Cage Projects, Inc., Los Angeles, Calif., a corporation of California Filed Aug. 30, 1943, Ser. No. 500,577

15 Claims. (Cl. 178—7.2)

This invention relates generally to radiovision systems designed to form visible images of objects obscured from sight by fog, haze, dust, darkness, etc., by use of electromagnetic waves of wave lengths which are relatively penetrative of such conditions or substances. The waves in contemplation consist of what are known as Hertzian or microwaves, the range extending between and including both short or ultra high frequency radio waves and infra red or heat waves. For convenience, the expression microwaves is here defined as including all electromagnetic waves capable of being used in the system, throughout a spectrum extending from ultra high frequency radio waves to and including waves in the infra red region.

Many efforts have been made in the past to provide a system capable of forming visual images of objects obscured by darkness, fog, etc., by utilization of rays in the infra red region. These have uniformly failed for conditions of fog, rain and snow, however, and a primary reason has been inability to provide sufficient infra red intensity at the receiving device. If reliance is placed on infra red naturally radiated from the field of view, success may be blocked at the outset by the fact that there is little or no pervading infra red energy under conditions of fog and storm. If heat-generated infra red is radiated into the field of view, to be reflected back to the receiving device, failure may result from the fact that heat-generated infra red radiation is of such short wave length that it is scattered and/or absorbed by the particles of the average fog, and is useless in snow storms.

It is accordingly the primary object of the present invention to provide a practical solution to the problem of providing a system capable of utilizing electromagnetic energy of wave lengths below the visible spectrum for the purpose of forming visual images of objects obscured by fog, darkness, haze, and the like.

Further objects of the invention may be listed as follows:

To provide an effective and efficient electrically driven source of microwaves, particularly within, but not limited to, the long infra red region;

To provide an effective and practical receiving device for microwaves, particularly within, but not limited to, the long infra red region; and To provide an effective and practical system for forming a visual image of a field of view, utilizing electromagnetic wave lengths in the infra red region, or longer.

In accordance with the present invention, speaking broadly, I provide a unique electrical generator of extremely short microwaves, the wave length of which is preferably sufficiently long to assure adequate penetration of fog, snow, or whatever substance may be present in the atmosphere, and is yet short enough to be resolved into an image on a receiving device of reasonable dimensions. This generator is designed to radiate a beam of such microwaves to the field to be observed for reflection back to the receiving station. A receiving device is also provided, and is designed to pick up these radiated microwaves which have been reflected back from the field of view, and to utilize said waves in the formation of a visual image. The preferred generator provided by the present invention is of a novel type providing an intense beam of microwaves, the wave length of which may easily be varied in the design of the generator, but which is fixed for any given generator. This generator comprises a large number of minute metal particles mounted in close spaced position on an insulation base, typically the surface of a Pyrex tube or bowl. These particles are charged by a suitable voltage, and then allowed to discharge. During such discharge, electrical oscillations take place in or about the particles, causing the generation of intense microwaves, which may be beamed to the field of view. The particles oscillate at a resonant frequency governed by their size, and it is hence possible to generate microwaves of various wave lengths by choosing particles of various grading. A particle size of approximately 100 mesh results in microwaves in the region of about 153 mu (approximately 2,000,000 megacycles), such as are well suited to the purposes of the present invention, being not seriously interfered with by fog, snow, and the like. An interesting phenomenon observed during such discharge is that the metal particles appear as though covered with little stars of light.

The receiving device, in its preferred form, resembles in its general or superficial physical make-up, though not in its internal characteristics and functions, the well known television "camera" known as the iconoscope. The image receiving plate of my novel receiving device consists of an insulation base on which are mounted a large number of small metal particles, similar to and of the same dimensional order as the aforementioned particles of the generator, and which are adapted, upon being cut by or subjected to the influence of microwaves of the wave length delivered by the generator, to be set into electrical oscillation. In other words, the particles in the receiving device are so chosen as to be resonant to the wave length delivered by the generator, and to be set into electrical oscillation by the incidence thereon of electromagnetic energy of that wave length. The fact that microwaves generated as described will set up an electrical response in an assembly of metal particles may be verified by simple experiment, minute sparks being observable in a receiving device consisting of iron filings embedded in an insulation base when subjected to a sufficiently intense field of microwaves to which the particles are resonant. In order to create a visual image, a somewhat more elaborate set-up is of course required, and the method and apparatus by which the electrical response set up in the metal particles of the receiving device is converted into a video signal will be left for description in the body of the specification.

My best present understanding of the invention will now be described in more detail, reference being had to the accompanying drawings indicating the best presently known forms thereof, and in which:

Fig. 1 is a diagrammatic illustration of my preferred microwave generator;

Fig. 1a shows a modified microwave generator in accordance with the invention;

Fig. 2 shows another modified form of microwave generator in accordance with the invention;

Fig. 2a is a longitudinal sectional view through the radiator element of the generator of Fig. 2;

Figure 3:
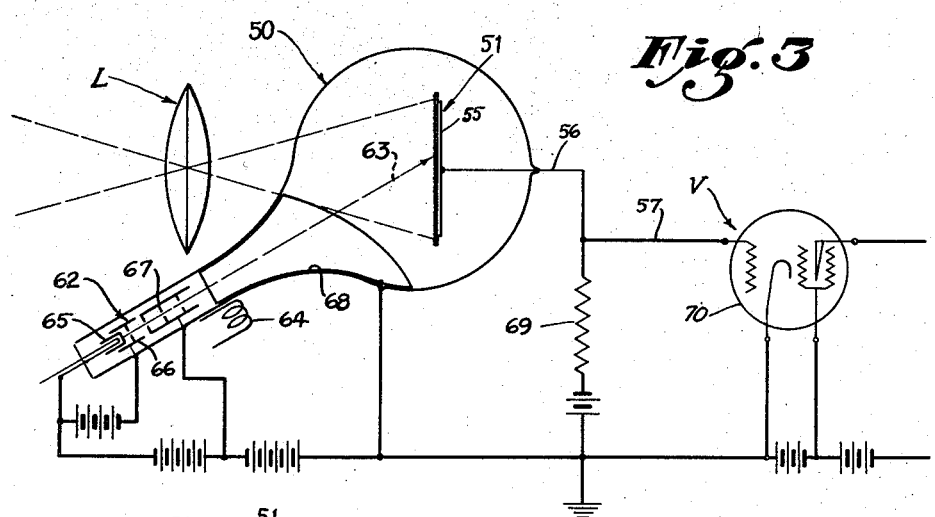
Fig. 3 is a diagrammatic illustration of the receiving device.

A description will first be given of one illustrative embodiment of my electrical microwave generator, reference being had to Fig. 1 of the drawings. Numeral 10 designates generally a bowl-shaped insulation base and radiator of Pyrex glass or the like. On the concave face of this radiator is a layer 11 of fine metal particles or filings, typically of Alnico metal, and insulated from one another. The wave length that will be generated depends principally upon the particle size, and may hence be varied to suit given requirements. Using Alnico metal and a particle size of the approximate order of 100 mesh, wave lengths in the approximate region of 153 mu are produced. The metal particles may be embedded directly in the surface of the glass and so held in place, or they may be cemented thereto with the use of any suitable cement. Sodium silicate serves the purpose nicely. The glass radiator with the metal particles cemented thereto is then thoroughly dried in an oven, and the surface of the metal particle layer is then preferably coated with a layer of sodium silicate, which serves to insulate the particles and the device is then again dried in the oven.

A metallic circular band 14, of tin foil or any suitable electrically-conductive metal, is then mounted on the rear or convex face of the radiator 10 in a concentric position with respect to its center, to serve as one electrode of the device. An electrical connection 15 is made to this electrode 14, and another electrical connection is made to the layer of metal particles. Preferably, this last connection comprises a conductive terminal pin or stud 17 mounted in and projecting through the central portion of the radiator, the forward portion of this pin or stud having been coated with the metal particles at the same time the metal particle layer was applied to the concave face of the radiator.

An energizing circuit 20 is provided by which high voltage impulses may be impressed across metal particle layer 11 and electrode 14, so as to subject the particles to a high voltage gradient. One typical and suitable form of such a circuit is shown in Fig. 1, being similar to an ordinary high tension battery system such as is used in automotive ignition. In the embodiment illustrated, two induction coils 21 and 22 are employed, the secondary winding 21a of the former being connected by lead 23 to terminal 17, and the secondary winding 22a of the latter being connected at one end to the aforementioned connection 15 to electrode 14. The other ends of the secondary windings of the two coils are connected to one of the primary windings of the respective coils, and the two primary windings are connected in parallel across battery circuit 26 and 27 including the source of current B, which may typically be a six-volt storage battery.

A conventional motor or power-driven circuit breaker or interrupter 30 has its contacts connected in series in circuits 26, 27, and across circuit breaker 30 is a condenser 31.

The coils 21 and 22 are so connected that the high tension terminal of one is positive while that of the other is negative, so that the potential difference between them is additive. The two coils may be so designed that this potential difference is for instance of the order of 30,000 volts max. at time of discharge.

Operation of the generator system is as follows: the breaker points being closed, the coils 21 and 22 are energized. Upon opening of the breaker contacts, the collapsing fields of the primary windings of the coils generate a voltage which charges the condenser 31, and the latter then discharges in a reverse direction through the primary windings, and induces a high voltage across the secondary windings of the coils. As will be evident from an inspection of the diagram of Fig. 1, these secondary voltages are in series, and a high tension voltage wave equal to double the voltage generated across each secondary is impressed across or between the layer of metal particles 11 and the electrode 14. The metal particles as so charged are set into electrical oscillation, and generate electromagnetic waves of very short wave lengths, which may be adjusted to be in the desired frequency region, by selection of the size and material of the particles. The precise limits of the wave lengths capable of being generated in this manner are not as yet known, but it has been determined that radiations of an unusual intensity may be generated in wave lengths of any predetermined wave band below the infra red. These waves as so generated are radiated to substantial distances from the radiator 10.

Fig. 1a shows a modified form of generator in which the insulation base 10a consists of a flat plate, as distinguished from the dished shape of Fig. 1. Cemented to the front face of this insulation plate 10a is a layer 11a of fine metal particles or filings, insulated from one another by the cement. Attached to the front face of the plate, along one edge thereof, is an electrically conductive bus 17a, over which the particles are overlapped, and connected to bus 17a is an electrical conductor 23a. Affixed to the rearward face of the plate, along the edge thereof opposite from bus 17a, is a rear plate or electrode 14a to which is connected conductor 15a. The flat plate generator of Fig. 1a is to be understood as electrically connected in the same energizing circuit as shown in Fig. 1, and operates as does the embodiment of Fig. 1.

In Fig. 2, I have diagrammatically indicated the combination of a metal particle generator with a parabolic reflector, by which a concentrated beam of generated radiations may be produced. In this instance, the insulation base of the generator comprises a Pyrex glass test tube 40, Fig. 2a, mounted in any suitable way on a conductive rod 41, which in the present instance is formed with a cup-shaped part 41a embracing the closed end of the test tube. Coated over the outside surface of the test tube is a layer 42 of fine metal particles, the latter overlapping the part 41a of rod 41. Around the inside of the tube is a conductive band or electrode 43. The tube 40 is positioned along the central longitudinal axis and at the focus of a relatively large parabolic reflector 46 having a polished inside surface adapted to reflect the generated waves. A lead 44 is connected at one end to electrode 43 and at the other end to the conductor of a lead-in insulator 45 mounted in the wall of the reflector. The supporting rod 41 for the tube projects from a lead-in insulator 47 mounted in the base of the reflector, and it is to be understood that an energizing system such as shown in Fig. 1 will be connected to the external terminals of the two mentioned lead-in insulators. The radiations emanating from the surface of tube 40 are reflected by the reflector 46 to form a concentrated parallel beam of generated waves which may be directed to the object or field of view of intrest. To give an idea of typical dimensions, for a tube 40 of one inch diameter, the reflector 46 may have a diameter of about four feet, so that the radiator is in the nature of a point source at the focus of the reflector.

Microwaves so generated and directed to the field of view are reflected back, and may be detected and converted into a visual image by a receiving system designed to be resonant to the wave lengths of the microwaves generated. An illustrative receiving system in accordance with the invention will now be described.

Fig. 3 diagrammatically indicates a cathode ray tube 50 containing a receiving plate 51 comprising a mosaic screen structure which preferably comprises an insulation base plate 52 of uniform thickness, such as a sheet of mica, on which is mounted a large number of minute, discrete metal particles 53 (see Fig. 4), such as Alnico particles, preferably of uniform size, distributed as uniformly as possible, and insulated from one another on the plate 52. The particles are preferably cemented to plate 52, for instance with Cryolite, and the cement serves to insulate the particles from one another. The particle size governs the wave length to which the particles will resonate, and if the receiving device is to be used with a generator of the type hereinbefore described, they should be of the same order of magnitude as the particles in the generator, or some submultiple thereof, such as one-half or one-quarter wave length. As in the generator, a particle size of about one hundred mesh may be regarded as typical, though I do not wish to be understood as limiting the invention to any necessary particle size, as wide departures may be expected, particularly with different metals. As for the material of the particle, any metal may be employed; in addition to Alnico, powdered iron, molybdenum, cobalt, tungsten, etc., have been experimented with, and all are found to be resonant to some particular wave length for any given particle size. As a matter of fact, Alnico has been used in the present work merely because of its ready availability in the particle size desired; Alnico may ultimately be found inferior to other materials because of its high magnetic properties.

The reverse or back surface of the mica sheet 52 is covered with a conductive film or signal plate 55, to which is connected a lead 56 passing out through the envelope of the cathode ray tube and connected to the grid lead 57 of video amplifier V. The latter is shown merely in conventional form, and will be understood to be subject to appropriate modification as desired.

A suitable optical pick-up element, here diagrammatically typified by a lens L, is designed and arranged to form an image of the object or field of view on the mosaic. Assuming use of the previously described microwave generator, beamed toward the field of view, the optical element L will form this image in microwaves reflected from the field of view, as will be understood. In cases in which the generator may not be used, the optical element L will form the image in whatever usable microwaves of wave lengths to which the device is responsive may be received from the field of view. Under many conditions, an infra red image of suitable intensity and wave length may be formed, relying entirely on pervading infra red energy reflected from the field of view, or radiated therefrom. For instance, some objects on which it may be desired to focus, as for instance a military tank, may radiate a considerable quantity of infra red energy.

The cathode ray tube also includes a suitable electron gun 62 adapted to develop a fine beam or pencil 63 of electrons and to direct and focus same to a fine spot on the mosaic. The cathode ray beam 63 is deflected horizontally and vertically by conventional beam deflecting means, such as coils or magnets, indicated diagrammatically at 64, so as to scan the area of the mosaic in a conventional manner.

The electron gun includes the usual indirectly heated cathode 65, control grid 66, first anode 67, and grounded second or collector anode 68 consisting of a metallic coating inside the neck of the tube and extending outwardly somewhat into the bulb thereof, as indicated. The control grid and anodes are potentiated in a usual manner, and have the usual function of controlling and focussing the electron beam and giving the electrons their velocity. The collector anode 68 and signal plate lead 56 are shown as connected across load resistor 69, which is in the grid circuit of the first amplifier tube 70 of the video amplifier. The external hook-up of the tube will be recognized to be shown in a conventionalized form, and may be modified as desired.

The operation of the receiving tube according to my best present understanding will now be described, though I wish it to be understood that I do not desire to be bound thereby, as the phenomena involved are somewhat obscure and later research may conceivably bring to light a still better or more fully complete explanation. The fine metal particles of the receiving plate or mosaic, either singly or in pairs or groups, function as dipoles, which are set into electrical oscillation as they are cut by the oncoming microwaves constituting the microwave image.

Assuming a single particle to function as a dipole, two opposite ends or lobes thereof go alternately positive and negative as the particle is progressively cut by an oncoming microwave to which the particle by reason of its size and nature is resonant. Or a pair or group of particles, electrically coupled to one another, by capacitance or otherwise, may function as a dipole, which is set into electrical oscillation as it is cut by an oncoming microwave to which the dipole, or the pair or group of particles of which it is composed, is resonant. In either case, the two lobes of the dipole go alternately through positive and negative phases with the changing phases of the oncoming microwave, responding predominantly to microwaves of some predetermined wave length to which the dipole is resonant, and the electrical oscillations so established varying in intensity or amplitude and in frequency with the intensity and wave length respectively of the received microwave image. It follows that the electrical oscillations so set up within a dipole occupying any local elemental area of the receiving plate will be governed in intensity by the intensity of the received microwave image at the local elemental area in question. Thus, in summary, the action of the microwave image focussed on the receiving plate is to set the various dipoles mounted thereon into oscillations of intensities governed by the local intensities of the microwave image, with the result that the two lobes of each dipole are driven alternately positive and negative, to intensities determined by the local intensities of the incident microwave energy.

Now, as the moving electron scanning beam crosses any given oscillating dipole, it will encounter both a positive lobe and negative lobe. Electrons are supplied by the scanning beam to the positive lobe to cancel or neutralize the latter, so leaving the dipole with a negative charge only, or with an excess of negative charge. Electrons supplied by the scanning beam not so collected by the positive lobes of the dipole are collected by the collecting electrode 68, which is at a positive potential relative to the average potential of the mosaic. The negative charge collected by the positive lobe of the dipole releases a like negative charge from the signal plate 55, which charge, flowing in the output circuit 56, 69, constitutes the video signal input to the amplifier V. The scanning beam having passed by a given dipole, and the signal impulse having been created in the signal or output circuit of the device, the charge on the two lobes of the dipole is redistributed, and the excess negative charge drained off by the collector 68 before the scanning beam returns for the next succeeding scansion.

While the above explanation may not be entirely complete in all respects, it is believed to portray the general mechanism involved in the present invention, and it explains how a video signal may be produced, without use of photosensitivity, through employment of metal particles which may be set into oscillation under the influence of received microwaves of relatively long wave length, of orders considerably beyond the range of presently known photosensitive devices such as typified by the iconoscope.

Figure 4:
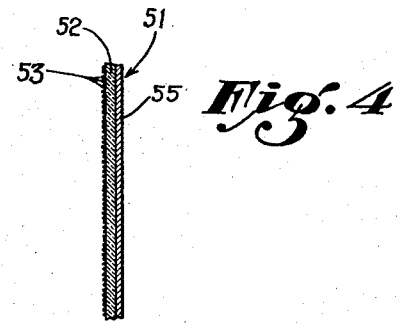
Fig. 4 is a magnified cross-sectional view of the receiving plate of the device of Fig. 3.
Figure 5:
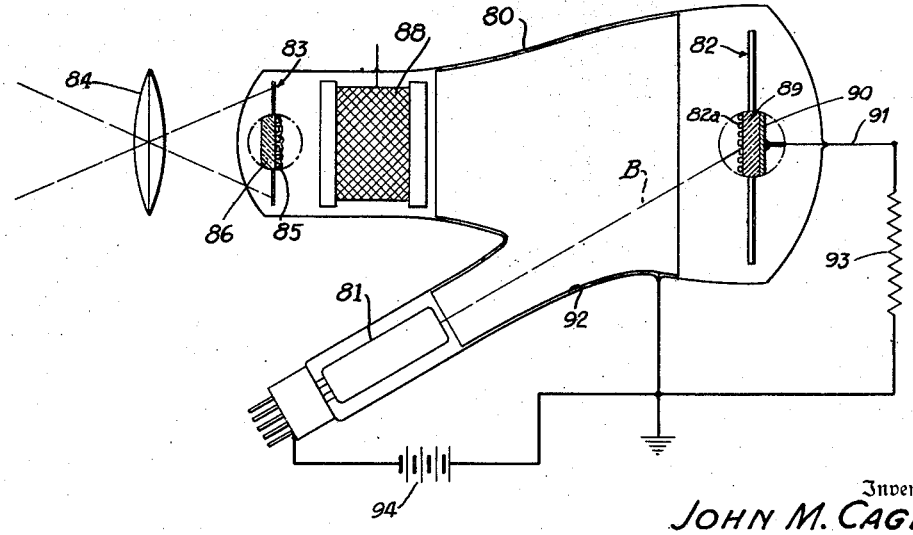
Fig. 5 is a diagrammatic illustration of a modified receiving device.

However, while my receiving device does not necessarily employ photosensitivity in its elemental form as above disclosed, I may employ a mosaic of particles which are designed to be electrically resonant to the received microwave, and which also have emissive characteristics which depend not upon photosensitivity but rather upon the particles being set into a state of electrical oscillation. In Fig. 5, for instance, I have diagrammatically illustrated a type of receiving tube in accordance with the invention employing emissive particles and a form of electron multiplication. The tube 80 contains an electron gun 81, a signal plate or target 82 adapted to be scanned by the electron beam B from electron gun 81, and a microwave-sensitive electron emissive cathode plate 83 positioned at the opposite end of the tube from target 82. An image in received microwaves is focussed on cathode plate 83 by means of optical element 84. The cathode plate 83 comprises a multiplicity of fine metal particles 85 cemented to the rearward face (the face away from optical element 84) of a transparent glass plate 86 (transparent to microwaves), the makeup being similar to that of Fig. 4 with the exception that no metal backing plate corresponding to the plate 55 is used. The fine metal particles 85 also differ from those of Fig. 4 in that they are caesiated, or otherwise treated, to render them capable of electronic emission when the dipoles formed by the metal particles are set into electrical oscillation under the influence of the received microwaves. For instance, they may be coated with silver oxide, and then with a layer of caesium.

The microwave image of the field of view being formed on the metal particle cathode, the dipoles made up of the metal particles are thus set into electrical oscillation, as previously described in connection with Figs. 3 and 4. This oscillating condition renders the particles emissive, and an electron image is emitted from the cathode plate. The phenomena is not that of photo-emission, since the received wave lengths are longer than those to which ordinary photo-sensitive targets are responsive. The metal particles are instead set into electrical oscillation, which in turn causes the electron emission, possibly because of highly localized surface heating, or high electrical activity.

The emitted electron image is transported to the target plate 82 by a usual electron lens 88. The target plate 82 may be of a well known mosaic type, comprising a multiplicity of minute metal particles 82a on an insulation base plate 89, which is backed up by the metal signal plate 90. To the latter is connected the usual output lead 91. A collector anode 92 in the form of a metallic coating on the inside of the tube may be employed, and the load resistance 93 may be connected between lead 91 and the anode 92. A battery 94 is conventionally indicated between anode 92 and a terminal at the base end of the electron gun.

The production of the signal impulse in response to arrival of the electron image at the target and scansion by the electron gun is the same as in conventional practice. Briefly, the electron image upon arrival at the target creates a charge image in the particles of the mosaic, and this charge image is commutated by the scanning beam in a manner causing signal currents to be developed in the output circuit consisting of the mosaic target, load resistance, collector anode, and space between anode and target.

As will be evident, the novelty in the receiving device of Fig. 5 consists in the use of the cathode plate consisting of a multiplicity of metal particles designed to be electrically resonant to received microwaves, and adapted to be set into electrical oscillation by such waves, which particles are capable of emitting an electron image during and by virtue of such an oscillating state. The use of the emitted electron image is subject to considerable modification, and while I have here indicated one conventional method of generating a signal current therefrom, other suitable methods are known and may obviously be utilized.

From the above it will be seen that I have provided, first, an improved electrical microwave generator of enhanced efficacy for the problem in hand, and second, a receiving device operable in conjunction therewith and resonant to the microwaves delivered by the generator. Both the generator and the receiving device employ electrically oscillative, fine metal particles as a translating means between electrical energy and electromagnetic energy of microwave dimensions, particularly in the region of the spectrum between wave lengths which, on the one hand, are too long for image resolution, and wave lengths which, on the other hand, are so short as to be too much scattered by fog and the like. The phenomena involved in my receiving device are not to be confused with those characteristic of such devices as the iconoscope, in which a received image in light rays, or in rays in the "near" infra-red, creates a charge image on a mosaic screen of photo-sensitized particles by photo-emission. My receiving device is distinguished from such prior devices by the utilization of metal particles which are electrically resonant to microwaves of wave lengths which may be longer than those to which devices of the iconoscope type will respond in any way, and which function by oscillating electrically under the influence of such microwave energy. The electrical oscillations of these metal particles are then utilized as above described in the generation of video currents, which may in turn be utilized to create visible images in accordance with conventional procedures. The gain over prior practices is principally in the unique capability for employing electromagnetic energy of longer wave lengths than has heretofore been possible in the creation of visible images, whereby such images may be obtained under conditions wherein electromagnetic energy of shorter and more usually employed wave lengths is frequently too scattered or dissipated for practical use.

I claim:

1. A generator of electromagnetic waves comprising an insulation base, a layer of closely spaced fine metal particles mounted on said base, and means for subjecting said layer of metal particles to a high voltage gradient.

2. A generator of electromagnetic waves comprising an insulation base, a multiplicity of fine metal particles mounted and insulated from one another on said base, and means for subjecting said metal particles to a high voltage discharge.

3. A generator of electromagnetic waves comprising a wall of insulation material, a layer of closely spaced fine metal particles mounted on one surface of said wall, an electrode positioned adjacent the opposite surface of said wall, and means for impressing a high voltage between said layer of fine metal particles and said electrode to set said particles into oscillation.

4. A generator of electromagnetic waves comprising an insulation wall having concave and convex surfaces, a layer of closely spaced fine metal particles mounted on the concave surface of said wall, an electrode mounted adjacent the convex surface of said wall, and means for impressing a high voltage between said layer of fine metal particles and said electrode.

5. A generator of electromagnetic waves comprising an insulation base, a layer of closely spaced fine metal particles mounted on said base, a substantially parabolic reflector surrounding said base, with said base positioned on the axis of said reflector, and means for subjecting said metal particles to a high voltage gradient.

6. In a system of the character described, the combination of a generator embodying a multiplicity of fine metal particles of relatively uniform size, means for subjecting said metal particles to a high voltage gradient to cause said particles to radiate electromagnetic waves of a predetermined wave length governed by the size of said particles, and a receiving device for said waves embodying a layer of fine metal particles of the same order of size as said metal particles in said generator mounted on an insulation plate, means for forming an image on said layer in said waves, and means for subjecting said image to scansion.

7. In a system of the character described, the combination of a generator embodying a multiplicity of fine metal particles of relatively uniform size, means for subjecting said metal particles to a high voltage gradient to cause said particles to radiate electromagnetic waves of a predetermined wave length governed by the size of said particles, and a receiving device for said waves embodying a layer of fine metal particles of the same order of size as said metal particles in said generator mounted on one face of an insulation plate, a signal plate adjacent the opposite face of said insulation plate, and means for scanning said image with a cathode ray beam.

8. In a receiver of the character described for microwaves of a predetermined wave length, the combination of an insulation base plate, a multiplicity of fine metal particles mounted on one face of said base plate, said metal particles being of a selected size such as will be set into electrical oscillation when subjected to microwaves of the predetermined wave length, a conductive signal plate adjacent the opposite face of said signal plate, means for forming an image in said microwaves on said layer of metal particles, whereby said metal particles function as a multiplicity of dipoles whose lobes go alternately positive and negative in response to the changing phases of the microwaves forming said image in said layer of particles, means for scanning said image with a cathode ray beam to effect neutralization of positive lobes of the dipoles traversed by the cathode ray beam and thereby cause signal impulses at said signal plate, and a positively potentiated collector electrode positioned to collect electrons from said layer of particles.

9. The method of reception of microwaves that comprises, forming said microwaves into an optical image, casting said image onto a layer of fine metal particles dimensioned to respond by electrical oscillation to said microwaves, whereby said particles function as a multiplicity of dipoles whose lobes go alternately positive and negative in response to the changing phases of the microwaves forming the image, and creating signal impulses by progressively neutralizing the positive lobes of the dipoles over the area of the image through addition of electrons from an electron source.

10. The method of reception of microwaves that comprises, forming said microwaves into an optical image, casting said image onto a layer of fine metal particles dimensioned to respond by electrical oscillation to said microwaves, whereby said particles function as a multiplicity of dipoles whose lobes go alternately positive and negative in response to the changing phases of the microwaves forming the image, positioning a signal plate adjacent to but out of electrical contact with said particles, and creating electrical signal impulses at said plate by progressively scanning said image with an electron beam whereby the positive lobes of the dipoles are neutralized.

11. The method of reception of microwaves that comprises, forming said microwaves into an optical image, casting said image onto a layer of fine metal particles dimensioned to respond by electrical oscillation to said microwaves, whereby said particles function as a multiplicity of dipoles whose lobes go alternately positive and negative in response to the changing phases of the microwaves forming the image, positioning a signal plate adjacent to but out of electrical contact with said particles, scanning said image with an electron beam whereby the positive lobes of the dipoles existent at the instant of scanning are neutralized, and removing excess electrons from the particles by creating in proximity thereto a positively potentiated zone.

12. A generator of electromagnetic waves comprising an insulation base, a layer of closely spaced fine metal particles mounted on said base, and means for subjecting said layer of metal particles to a high voltage gradient substantially in the plane of said layer.

13. A generator of electromagnetic waves comprising an insulation base, a layer of closely spaced fine metal particles mounted on said base, and means for subjecting said layer of metal particles to a high voltage discharge.

14. In a system of the character described, the combination of a plurality of metal particles of uniform size mounted on an insulation base, means for setting said particles into electrical oscillation including means for subjecting said metal particles to a high voltage gradient, whereby said particles radiate electromagnetic waves, and a receiving device for said waves embodying a layer of metal particles sized to be electrically resonant to said waves and mounted on an insulation base, means for forming an image on said layer in said waves, and means for subjecting said image to scansion.

15. In a system of the character described, the combination of a plurality of metal particles of uniform size mounted on an insulation base, means for setting said particles into electrical oscillation including means for periodically subjecting said metal particles to a high voltage gradient, whereby said particles radiate electromagnetic waves, and a receiving device for said waves embodying a layer of metal particles sized to be electrically resonant to said waves and mounted on an insulation base, means for forming an image on said layer in said waves, and means for subjecting said image to scansion.

References Cited in the file of this patent

UNITED STATES PATENTS

| | | |
|---|---|---|
| 1,945,039 | Hansel | Jan. 30, 1934 |
| 2,065,570 | Essig | Dec. 29, 1936 |
| 2,075,808 | Fliess | Apr. 6, 1937 |
| 2,121,771 | Jones | June 21, 1938 |
| 2,155,471 | Cawley | Apr. 25, 1939 |
| 2,168,259 | Gorlich | Aug. 1, 1939 |
| 2,185,601 | McGee et al. | Jan. 2, 1940 |
| 2,265,796 | Boersch | Dec. 9, 1941 |

OTHER REFERENCES

Textbook, "Matter, Electricity, Energy," by Gerlach and Fuchs, 1928 edition, pages 292–293. Copy in Div. 54, "Short Electric Waves."